United States Patent Office 3,317,023
Patented May 2, 1967

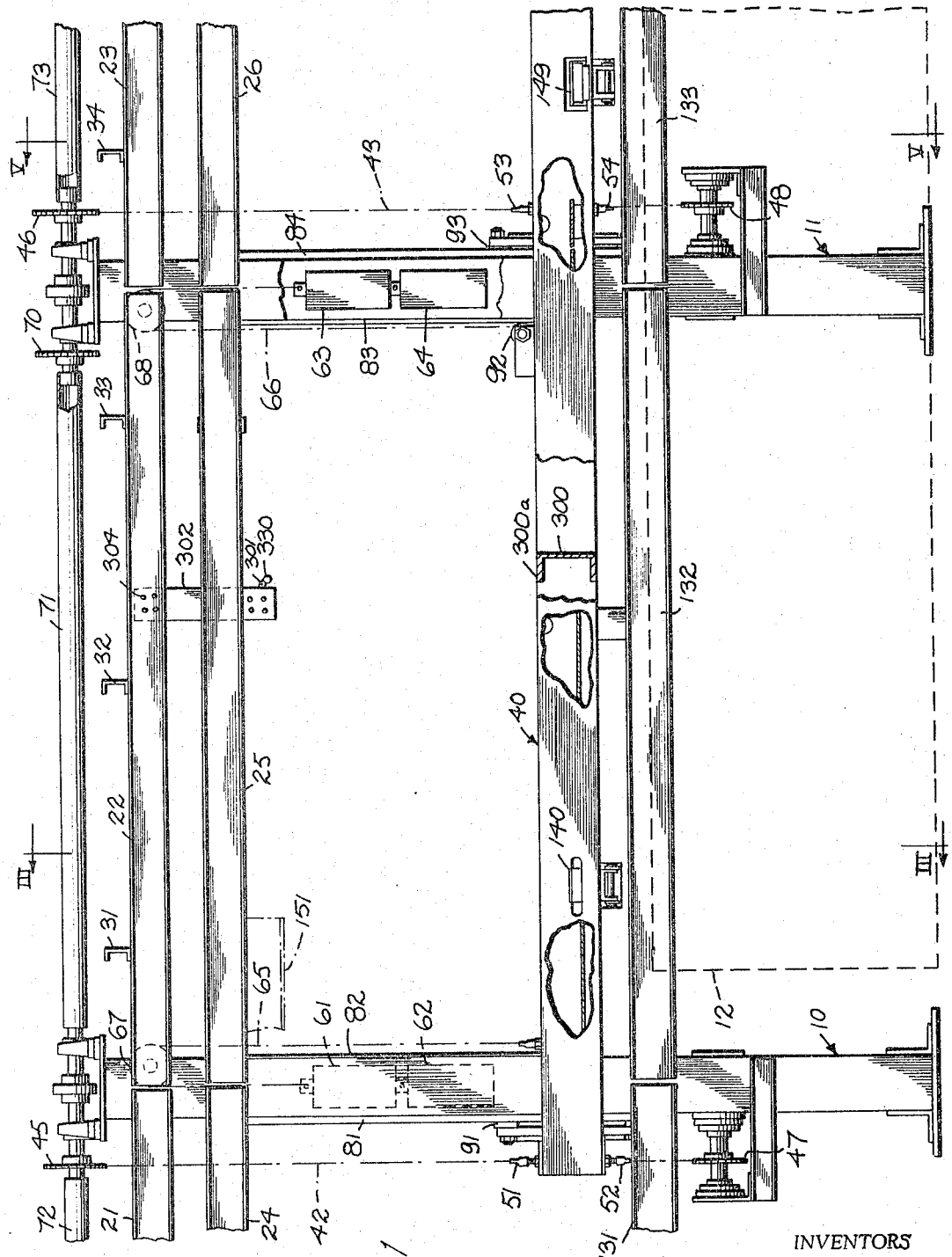

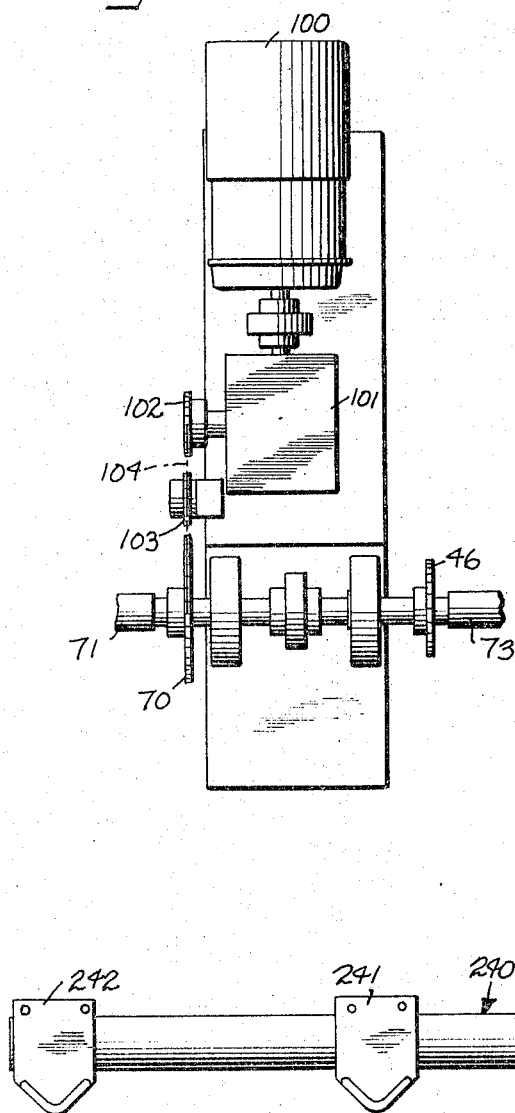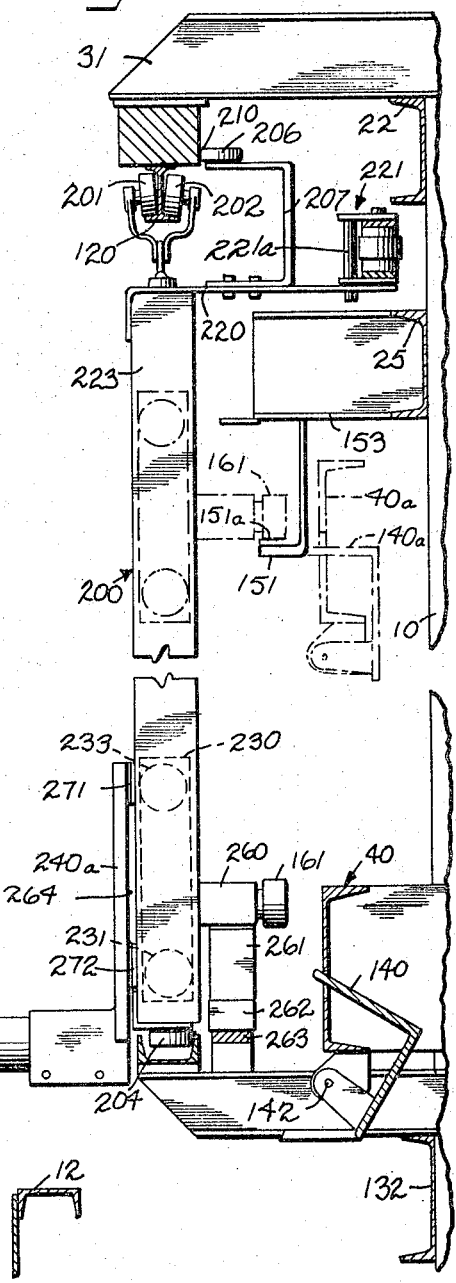

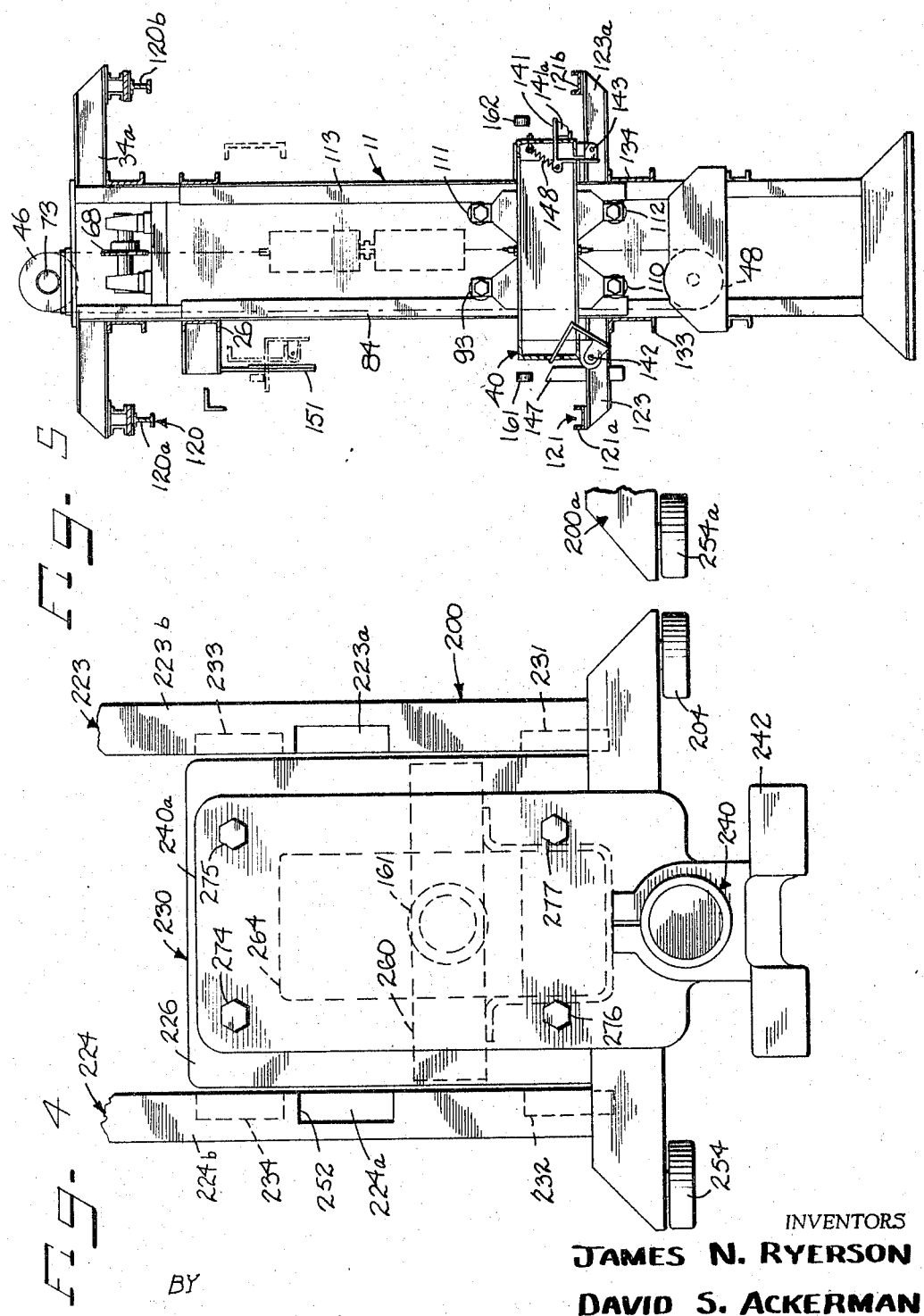

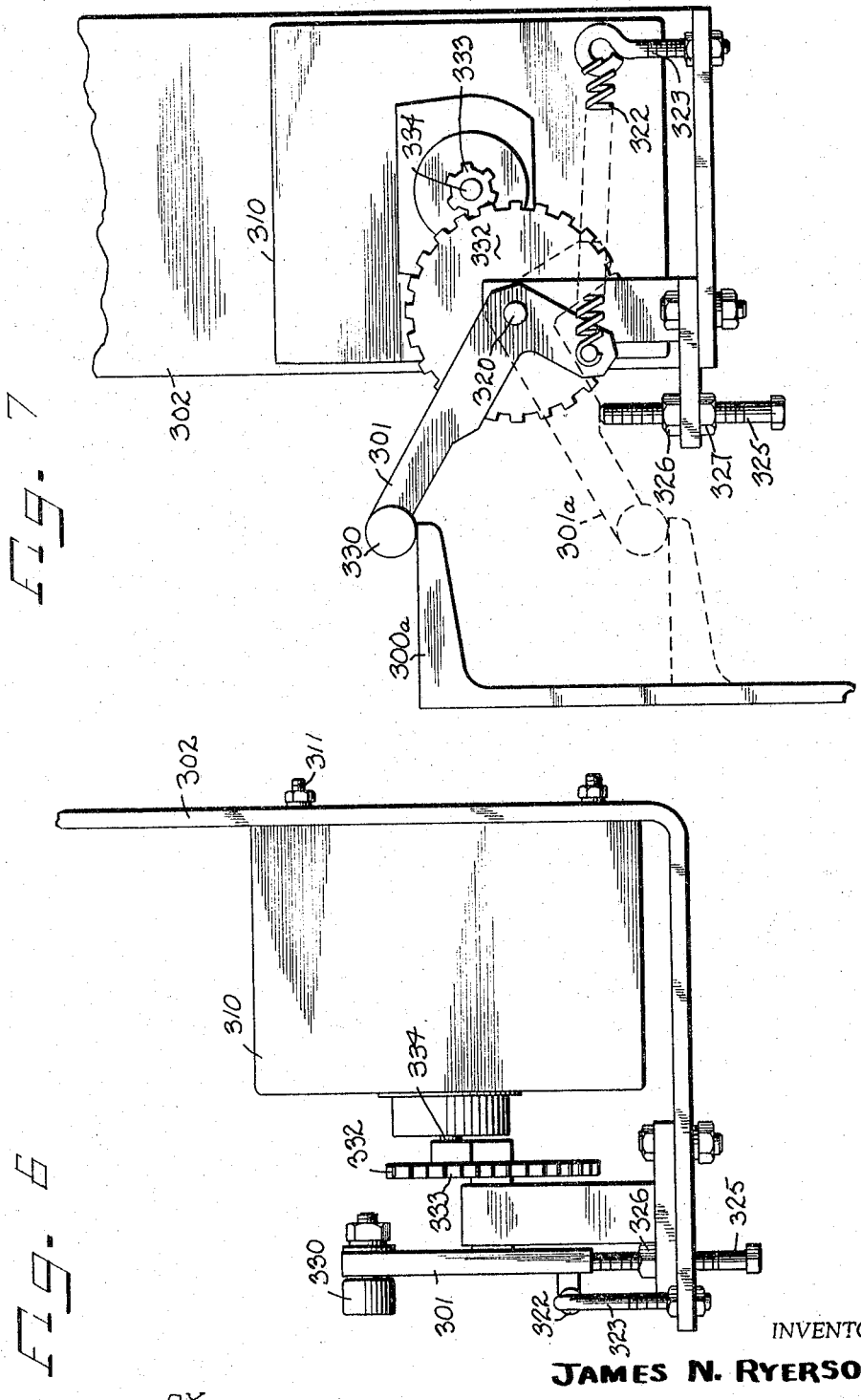

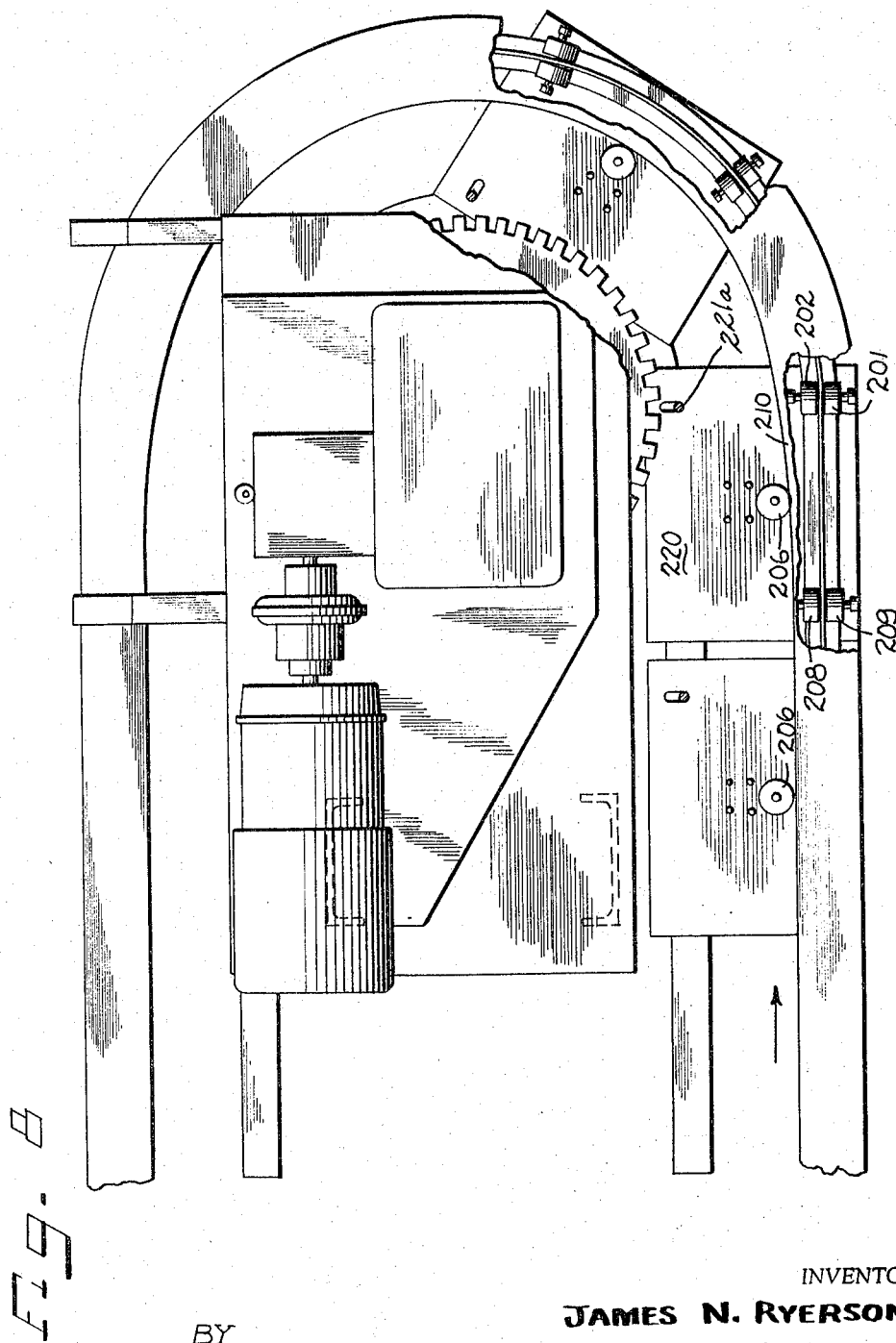

3,317,023
PLATING MACHINE
James N. Ryerson, 195 Comanche Drive, Oceanport, N.J. 07757, and David S. Ackerman, 712 Amherst Road, Linden, N.J. 07036
Filed Mar. 31, 1964, Ser. No. 356,113
3 Claims. (Cl. 198—19)

This invention relates to a processing machine and particularly to a processing machine having a series of treatment stations between which the work must be transferred in an elevated position.

A preferred embodiment in accordance with the present invention involves a series of carrier guide frames having work carriers vertically reciprocally carried thereby, the work carriers being suspended for horizontal movement along a curved path by a uniquely simple and economical arrangement which maintains the carrier frames in a desired vertical disposition. The carrier guide frames are preferably constructed in a novel manner such that work carriers may be removed therefrom as a unit without any disassembly of the carrier guide frames. Further features of the preferred machine relate to the construction for driving an extending elevator frame which serves to raise and lower a number of work carriers simultaneously and for controlling the deceleration of the elevator frame at its upper limit of travel. The elevator frame is counterweighted by an arrangement greatly facilitating the placing of the system in operation.

It is therefore an object of the present invention to provide a particularly simple and economical arrangement for suspending and guiding a series of carrier guide frames for horizontal movement along a curved path.

It is another object of the present invention to provide a carrier guide frame construction enabling removal of the work carrier therefrom without disassembly of the carrier guide frame.

A further object of the invention is to provide an improved drive mechanism for an extended elevator frame utilized to simultaneously raise and lower a series of work carriers.

Another object of the invention relates to the provision of a novel and improved drive control for automatic deceleration of the elevator frame near a limit of travel thereof.

Still another object of the invention is to provide an improved counterweight construction for an extended elevator frame which is used to raise and lower a series of work carriers simultanously.

Yet another object of the invention is to provide a unitary processing machine of the return type having substantially improved durability and performance while utilizing to a maximum extent commercially available components.

Other objects, features and advantages of the present invention will be apparent from the following detailed description taken in connection with the accompanying drawings, in which:

FIGURE 1 is a fragmentary somewhat diagrammatic side elevational view of a portion of a return type plating machine in accordance with the present invention;

FIGURE 2 is a somewhat diagrammatic fragmentary top plan view of the structure of FIGURE 1 showing certain details of the elevator drive mechanism;

FIGURE 3 is a fragmentary vertical sectional view taken generally along the line III—III of FIGURE 1;

FIGURE 4 is a fragmentary enlarged elevational view of a carrier guide frame assembly and its associated work carrier showing preferred construction of these components for the machine of FIGURE 1;

FIGURE 5 is a somewhat diagrammatic vertical sectional view taken generally along the line V—V of FIGURE 1;

FIGURE 6 is a somewhat diagrammatic side elevational view of the elevator control mechanism for the machine of FIGURE 1;

FIGURE 7 is an end elevational view of the structure of FIGURE 6; and

FIGURE 8 is a fragmentary somewhat diagrammatic plan view of a portion of the machine of FIGURE 1.

A shown on the drawings:

FIGURE 1 illustrates typical constructional features for a processing machine in accordance with the present invention. Reference numerals 10 and 11 indicate two upright columns of a machine which may have a series of six vertical columns, for example. The illustrated machine is of the return type wherein the columns extend along the center line of the machine and the work is transported in one direction through a series of tanks at one side of the machine and then returns in the opposite direction at the opposite side of the machine. For purposes of illustration, a processing tank has been diagrammatically indicated at 12 and the work has been assumed to be moving from left to right as viewed in FIGURE 1. The framework of the machine may further comprise longitudinal channel members such as indicated at 21–26 secured to the columns such as 10 and 11. The frame further includes transverse frame members such as indicated at 31–34.

An elevator frame 40 is shown in FIGURE 1 which may be mounted for vertical reciprocation by means of structure associated with columns 10 and 11 and a further column to the right of column 11. The elevator frame 40 is raised and lowered by means of chain loops such as indicated at 42 and 43 extending over respective upper sprocket wheels 45 and 46 and respective lower sprocket wheels 47 and 48. The ends of the chains 42 and 43 are secured to the elevator frame 40 as indicated at 51–54.

Counterweights for the elevator frame are indicated at 61–64 and are vertically reciprocal within the columns 10 and 11 and are coupled with the elevator frame 40 by means of chains 65 and 66 passing over sprocket wheels indicated at 67 and 68. A similar counterweight arrangement is provided at the other column associated with the elevator frame 40.

The sprocket wheels 45 and 46 may be driven from a sprocket wheel 70. A torque tube 71 couples the driving sprocket wheel 70 with the sprocket wheel 45, and a further torque tube 72 is indicated for coupling with two further sprocket wheels associated with a second elevator frame (not shown) at the left end of the machine. Similarly a torque tube 73 couples driving sprocket wheel 70 with a sprocket wheel (not shown) associated with the right hand end of elevator frame 40. This last mentioned sprocket wheel may be arranged in a manner analogous to sprocket wheel 45.

The elevator frame 40 may be guided in its vertical reciprocation by means of rails such as indicated at 81–84 on the columns 10 and 11 which guide rollers such as indicated at 91–93 carried by the elevator frame.

FIGURE 2 shows certain details of the drive for sprocket 70 which includes a motor 100, reducing gearing 101, an output drive sprocket 102 and an idler sprocket 103. A sprocket chain 104 extends about the sprockets 102, 103 and 70 for driving of the sprocket 70 and the associated components.

FIGURE 5 shows additional details of the elevator frame structure 40 and shows rollers 93 and 110 riding on the vertical track 84 and similar rollers 111 and 112 riding on a second vertical track 113 of column 11. Roller 91 may be one of four rollers arranged at the left side of column 10, FIGURE 1, in a manner similar to that shown in FIGURE 5 for rollers 93, 110, 111 and 112.

As seen in FIGURE 5, the transverse members such as 34 and 34a support an upper carrier guide frame track or monorail 120 of elongated loop configuration and including straight length portions 120a and 120b.

A lower carrier guide frame track 121 of corresponding loop configuration includes straight length sections 121a and 121b supported by transverse frame members such as indicated at 123 and 123a. The transverse frame members such as 123, 123a are supported by longitudinal frame parts such as indicated at 131–133 in FIGURE 1 and such as indicated at 133 and 134 in FIGURE 5.

Referring to FIGURE 5, it will be observed that the carrier frame 40 may carry pivotal track sections such as indicated at 140 and 141 mounted for pivotal movement on shafts such as indicated at 142 and 143. As indicated in FIGURE 5, a member 147 associated with the stationary framework may serve to pivot track section 140 to an inactive position in the down position of elevator frame 40. A spring 148 may serve to urge track section 141 to its active position while accommodating pivoting of the track section 141 as the elevator frame 40 moves to its lower position. The track section 140 thus serves to lower work carriers into tanks such as indicated at 12 in FIGURE 1 while track sections such as indicated at 141 in FIGURE 5 and such as indicated at 149 in FIGURE 1 are effective to raise work carriers out of processing tanks for transfer between successive tanks.

The upper position of the elevator frame is indicated diagrammatically at 40a in FIGURE 3 and it will be observed that a track 151 is disposed so that its lower edge will engage a portion of track section 140 and pivot the track section to its operative position as the elevator frame reaches its upper position. The track 151 may be secured to a frame section 153.

The position of a carrier frame pick-up roller 161 is indicated in FIGURES 3 and 5. It will be observed that as the elevator frame 40 is raised, track section 140 will clear roller 161 leaving the associated work carrier in its down position with its work immersed in a tank such as indicated at 12. On the other hand referring to FIGURE 5 as the elevator frame is raised, track section 141 will engage a pick-up roller 162 to lift the associated work carrier to its upper position.

As the elevator frame moves downwardly, the track section 141 will be in its operative position supporting the roller of a work carrier until the work carrier reaches its lower position, while the track section 141 will engage a pick-up roller such as indicated at 162 at its lower edge 141a to cause the track section 141 to pivot inwardly about shaft 143 to allow the track section 141 to reach a position below the carrier pick-up roller 162 as indicated in FIGURE 5.

A series of carrier guide frames such as indicated at 200 in FIGURE 3 are supported vertically from track 120 by means of rollers such as indicated at 201 and 202. By way of example, each carrier guide frame may have an overall length in the direction of movement of 17 inches and may have a pair of rollers such as indicated at 201 and 202 at the front and rear thereof with respect to the direction of movement separated by a distance of 14½ inches. The carrier guide frames may also have lower rollers such as indicated at 204 at the front and rear thereof with respect to the direction of movement and separated by a distance of 14½ inches.

A further roller 206 is mounted with each carrier guide frame by means of a bracket such as indicated at 207 so that the roller 206 is disposed intermediate the length of the guide frame in the direction of travel as seen in FIGURE 8. Thus the roller 206 is disposed intermediate the two sets of rollers such as indicated at 201, 202 and 208, 209 in FIGURE 8. The roller 206 rides on a vertical surface indicated at 210.

As seen in FIGURE 3, a horizontal plate 220 extends from the main portion of the carrier guide frame 200 and is secured with a horizontal conveyor chain 221 so that horizontal movement of the conveyor chain 221 in a closed loop path moves the carrier guide frames such as 200 in a loop path past the successive processing stations of the machine.

The carrier guide frames such as 200 comprises a pair of opposed vertically extending channel members 223 and 224, FIGURE 4, for guiding a carriage 230 for vertical reciprocation. The carriage 230 has a carriage frame 226 with lower rollers 231 and 232 and upper rollers 233 and 234. A carrier arm assembly 240 extends outwardly from the carriage 230 and is provided with a pair of work support brackets 241 and 242. Suitable supporting racks are detachably suspended from the brackets 241 and 242.

Because of the moment exerted on the carriage 230 by the work associated with the arm assembly 240, the lower rollers 231 and 232 of the carriage ride on the rear flanges indicated at 223a and 224a in FIGURE 4 of the channel members 223 and 224. The upper rollers 233 and 234 ride on the front flange members 223b and 224b of the vertical channel members 223 and 224.

The front flanges 223b and 224b are provided with notches 251 and 252 of a size to receive therethrough the lower rollers 231 and 232 to provide for removal of the carriage 230 without disassembly of the carrier guide frame 200. After the lower rollers have been removed through the notches 251 and 252, the carriage 230 may be pivoted and lowered and the upper rollers 233 and 234 also removed through the notches to entirely disengage the carriage 230 from the carrier guide frame.

Referring to FIGURE 4, the reference numeral 254 designates a second lower roller for the carrier guide frame 200 and a roller 254a is indicated for a second carrier guide frame 200a in FIGURE 4.

As seen in FIGURE 3, carriage 230 carries a horizontal plate 260 for supporting the roller 161 which is engageable with the elevator frame 40, and this plate 260 has a depending support element 261 carrying a suitable brush 262 for sliding engagement with a copper bus 263 which extends along the electroprocessing tanks of the machine such as the tank 12 indicated partially in FIGURE 3. An electric conductive path is provided the brush 262 through members 261 and 260 to a plate 264 which is secured to the carrier arm mounting plate 204a. The elevator roller 161 may be insulated from member 260 in any suitable manner if desired. The carriage frame 226, FIGURE 4, of the carriage 230 which frame carries the rollers 231–234 is insulated from the carrier arm assembly 240 as indicated at 271 and 272 in FIGURE 3. Bolts 274–277 are indicated in FIGURE 4 for securing carrier arm mounting plate 240a to the carriage frame 266 with the insulation means such as 271 and 272 separating the two members. The bolts 274–277 if of conductive material are, of course, suitably insulated from either the frame 266 or the mounting plate 240a.

By way of example, the track 151 indicated in FIGURE 3 may be fixed to the horizontal frame member 25 of the machine and extended for a distance corresponding to the distance between elevator track sections 140, FIGURE 1, and a preceding pick-up elevator track section of the machine (not shown) similar to track section 141, FIGURE 5. As indicated in FIGURE 3, pivotal track section 140 in its upper position indicated in dot-dash outline at 140a has its upper surface just below the level of the upper surface 151a of the horizontal track section 151 so that the pick-up roller 161 may move along the track section 151 to track section 140a after which the carrier arm assembly 240 may be lowered to immerse the work suspended therefrom in tank 12 indicated in FIGURE 1.

After the elevator frame 40 has reached its upper position indicated at 40a in FIGURE 3, the conveyor chain 221 is advanced, moving a carrier frame to a position on track section 140. Thereafter, the elevator frame 40 is moved downwardly to lower the carriage 230 of the carrier frame to the position shown in solid outline in FIGURE 3.

It will be understood that the arrangement indicated in FIGURE 1 is given solely by way of example and not of limitation.

Referring to FIGURE 1, it will be observed that the elevator frame 40 includes a channel member 300 having a flange part 300a which is arranged to engage a pivotal arm 301 as the elevator frame 40 moves to the upper position. The pivotal arm 301 is carried on a mounting plate 302 secured to the frame member 22 by means of bolts such as indicated at 304.

The purpose of the arm 301 is to control a rheostat assembly indicated at 310 in FIGURE 6 which in turn provides for a slowing down of the driving motor 100, FIGURE 2, as the elevator frame reaches its upper position. The rheostat assembly 310 is secured to the plate 302 by means of bolts such as indicated at 311.

As seen in FIGURE 7, the upward movement of the elevator frame moves the arm 301 from a position such as indicated in dash outlines at 301a to a position such as shown in solid outline in FIGURE 7. The arm 301 is secured to a shaft 320 and its pivotal movement is resisted by a tension spring 322 having one end connected with the arm 301 and its opposite end connected to a fixed member 323. The lower position to which the arm 301 is moved by the spring 322 is adjustably determined by a screw 325 which is locked in its adjusted position by means of nuts such as indicated at 326 and 327. The arm 301 is indicated as being provided with a roller 330 for engaging the flange 300a.

Secured on the shaft 320 is a gear wheel 332 which in turn drives a gear 333 fixed to a shaft 334 of the rheostat assembly 310. The rheostat assembly 310 may thus provide a progressively increasing resistance as the arm 301 moves from the dash position 301a to the solid line position in FIGURE 7 to progressively decrease the speed of the motor 100 providing the driving force for raising of the elevator frame 40.

We claim as our invention:

1. A processing machine comprising
   (a) a carrier guide frame for movement along a work path and having a carriage for vertical reciprocation in said frame to raise and lower work units carried at one side of said frame by said carriage,
   (b) a monorail suspending said guide frame therefrom and comprising a semicircular monorail section of substantially constant radius and straight length monorail sections connected with the opposite ends of said semicircular monorail section,
   (c) a curved lower track extending below said semicircular monorail section for guiding the lower end of said guide frame,
   (d) a curved vertically disposed rail face extending adjacent said semicircular monorail section at the side of said guide frame opposite said one side and directed radially inwardly,
   (e) said carrier guide frame having spaced pairs of rollers rotatable on horizontal axes and riding on said monorail and having a further roller rotatable on a vertical axis and riding on said vertically disposed rail face, and
   (f) a single conveyor chain coupled with said carrier guide frame and extending along a curved path adjacent and radially inwardly of said monorail and connected with said carrier guide frame for moving said carrier frame along said monorail,
   (g) said vertically disposed rail face having a relatively greater spacing from said monorail intermediate the ends of said semicircular section than at the ends of said semicircular section.

2. A processing machine comprising
   (a) an elongated framework extending along a series of processing stations,
   (b) an elongated elevator frame mounted for vertical reciprocation on said framework between a lower and an elevated position,
   (c) means on said elevator frame for elevating work carriers from at least a plurality of said processing stations simultaneously,
   (d) conveyor means for moving the work carriers between successive ones of said series of processing stations and for transferring work carriers to and from said plurality of processing stations in elevated position of the elevator frame, and
   (e) counterweight means connected with said elongated elevator frame at each of a plurality of positions along the length thereof for counterbalancing the weight of said elevator frame and the work carriers to be raised thereby, said counterweight means comprising at least first and second separate sections having fastening means securing said sections for joint counterbalancing action, whereby said first and second sections of said counterbalancing means at each of said positions along the length of said elevator frame may be successively connected with the elevator frame in accordance with the loading of the elevator frame during initial feeding of work carriers to said processing stations by the use of said conveyor means.

3. In a processing machine,
   (a) a carrier guide frame comprising two parallel vertical extending channel members disposed in spaced parallel relation with respect to each other and providing respective front and rear vertically extending track portions,
   (b) a carriage movable vertically along said carrier guide frame and having a carrier arm extending laterally from the front side thereof and disposed adjacent the lower end thereof,
   (c) said carriage having upper and lower rollers confined in said channel members, the overhanging weight of said carrier arm engaging the upper rollers with the front vertically extending track portions of said channel members and the lower rollers with the rear vertical extending track portions,
   (d) a monorail,
   (e) means suspending said carrier guide frame from said monorail for movement therealong,
   (f) said monorail comprising a semicircular monorail section of substantially constant radius and straight length monorail sections extending from opposite ends of said semicircular monorail section,
   (g) a lower track portion disposed beneath said monorail section and conforming generally to the form of said monorail section,
   (h) a vertically disposed rail face disposed inwardly of said monorail and generally conforming to the form thereof,
   (i) vertically spaced rollers on said carrier guide frame having guiding engagement with said rail face and said lower track portion,
   (j) a single conveyor chain coupled with said carrier guide frame and conforming generally to the form of said monorail for moving said carrier guide frame along said monorail,
   (k) and said front track portions of said carriage having openings therein larger than the diameters of said upper and lower rollers and disposed beneath the upper rollers when said carriage is in its lowermost position, to accommodate removal of said carriage from said carrier guide frame and the insertion of said carriage into operative association with said front and rear vertically extending track portions without disassembling said carrier guide frame.

References Cited by the Examiner
UNITED STATES PATENTS

| | | | |
|---|---|---|---|
| 1,793,062 | 2/1931 | Collier | 198—158 |
| 2,242,892 | 5/1941 | Light. | |
| 2,529,948 | 11/1950 | Jones. | |
| 2,576,107 | 11/1951 | Davis et al. | 198—158 |
| 2,874,852 | 2/1959 | Frederick | 214—89 X |
| 2,933,212 | 4/1960 | Hauck | 214—89 |
| 3,094,475 | 6/1963 | Jackson et al. | 214—89 X |
| 3,152,705 | 10/1964 | Lammert | 214—89 |
| 3,167,193 | 1/1965 | Klosk | 214—83.26 |
| 3,193,121 | 7/1965 | Kumpf et al. | 214—89 |

GERALD M. FORLENZA, *Primary Examiner.*

ALBERT J. MAKAY, *Examiner.*